United States Patent [19]
Tatsumi

[11] 3,791,472
[45] Feb. 12, 1974

[54] VEHICLE BODY CONSTRUCTION

[75] Inventor: Hiroshi Tatsumi, Tokyo, Japan

[73] Assignee: Nissan Motor Company Limited, Yokohama, Japan

[22] Filed: Sept. 13, 1971

[21] Appl. No.: 179,807

[52] U.S. Cl............ 180/64 R, 280/106 R, 296/28 F
[51] Int. Cl......................... B60k 5/12, B62d 21/00
[58] Field of Search ..... 180/64; 280/106; 296/28 R, 296/28 F, 28 J

[56] References Cited
UNITED STATES PATENTS

| | | | |
|---|---|---|---|
| 2,954,998 | 10/1960 | Kushler et al. | 180/64 R X |
| 3,162,478 | 12/1964 | Richards | 280/106 R X |
| 3,108,836 | 10/1963 | Deckert | 280/106 R X |
| 2,301,330 | 11/1942 | Schafer | 280/106 R |

FOREIGN PATENTS OR APPLICATIONS 1,074,416  1/1960  Germany .......................... 296/28 F Primary Examiner—Kenneth H. Betts
Assistant Examiner—Milton L. Smith
Attorney, Agent, or Firm—William E. O'Brien; George A. Depaoli; Donal E. McCarthy

[57] ABSTRACT

An underbody structure including a pair of transversely spaced, longitudinally extending side sills, a floor panel connected at its lateral edges to the side sills, a pair of transversely spaced, longitudinally extending side rails having longitudinally rearwardly extending extensions, an engine rear mount member transversely extending between and rigidly connected to the extensions of the side rails, and a pair of bridges rigidly connecting rear end portions of the extensions to the adjacent portions of the side sills. The extensions, the engine rear mount member, torque boxes and the connecting bridges are vertically separated from the floor panel.

10 Claims, 16 Drawing Figures

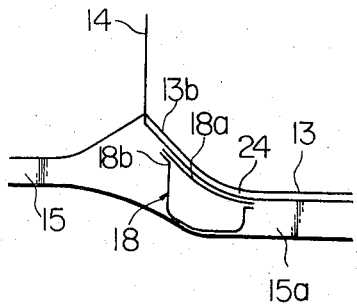
Fig. 6
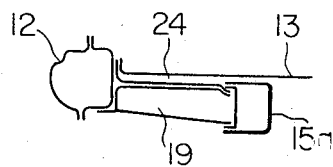
Fig. 7
Fig. 8
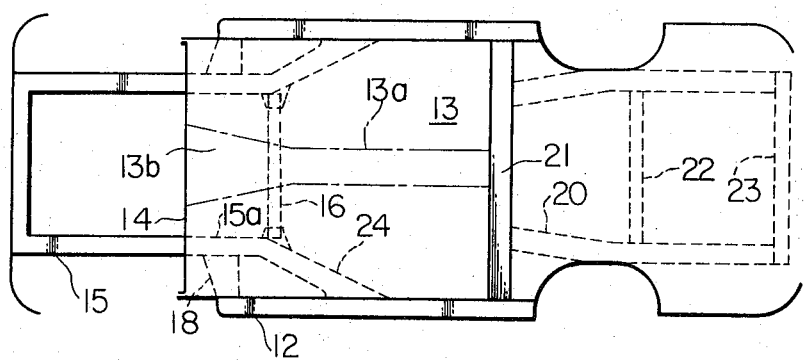

VEHICLE BODY CONSTRUCTION

This invention relates to vehicle body constructions and, more particularly, to an underbody structure for a sedan or van type motor vehicle.

In modern sedan or van type motor vehicles, a pair of chassis frames are unitized with a vehicle body to provide a so-called unit construction. This construction is economical to build and relatively light in weight, yet it possesses strength and torsional rigidity required for modern vehicle construction. In this construction, however, it is quite difficult to prevent vibrations carried from the driving system and the suspension system from transferring through the floor panel to the passenger compartment, thus impairing riding qualities demanded for the vehicle occupant.

To eliminate this difficulty, a conventional separate frame type construction has returned again to the market for the reason that the separate frame type construction is effective in reducing the vibrations and noises transmitted to the passenger compartment. The separate frame type construction is, however, disadvantageous in that it is heavy in construction and more expensive to produce.

It is, thereofre, an object of this invention to provide a vehicle underbody construction which is highly effective in preventing vibrations and vibration noises from transmitting to the passenger compartment whereby fine riding qualities are obtained.

Another object of this invention is to provide a vehicle underbody structure providing highly improved riding qualities while at the same time providing favorable weight and cost characteristics and possessing the requisite torsional rigidity.

In order to achieve these and other objects and advantages, the present invention contemplates to incorporate most of the advantages of a unit construction while adopting several advantageous features of a separate frame type construction. The underbody structure of the present invention features several component elements for supporting a driving system and a suspension system being separated from the floor panel of the passenger compartment thereby to avoid transmission of vibrations and vibration noises to the floor panel. To this end, the underbody structure includes a pair of transversely spaced longitudinally extending side sills and a pair of side rails. The side rails are spaced inwardly of the side sills and respectively have extensions extending longitudinally and rearwardly under the floor panel. An engine rear mount member runs transversely between the extensions of the side rails and is connected thereto. Two torque boxes are respectively disposed in between and connected to the extensions and the side sills. To provide torsional rigidity, a connecting means is provided for connecting the extensions to the side sills at the rear end portions of the extensions. The extensions of the side rails, engine rear mount member, torque boxes and connecting means are separated from the floor panel of the vehicle body so that the load shocks carried from the suspension system or the vibrations transferred from the driving system are spread widely over a greater area of the side sills.

In the accompanying drawings:

FIG. 6 is a sectional view taken on line 6—6 of FIG. 2;

FIG. 7 is a sectional view taken on line 7—7 of FIG. 2;

FIG. 8 is a plan view of a modified form of the underbody structure shown in FIG. 1;

Figure 4:
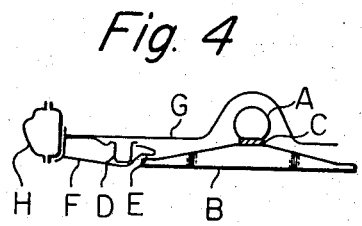
FIG. 4 is a sectional view illustrating a part of a conventional underbody structure, the part corresponding to that of FIG. 3.
Figure 5:
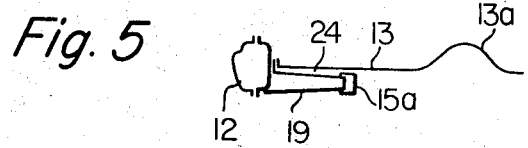
FIG. 5 is a sectional view taken on line 5—5 of FIG. 1.
Figure 9:
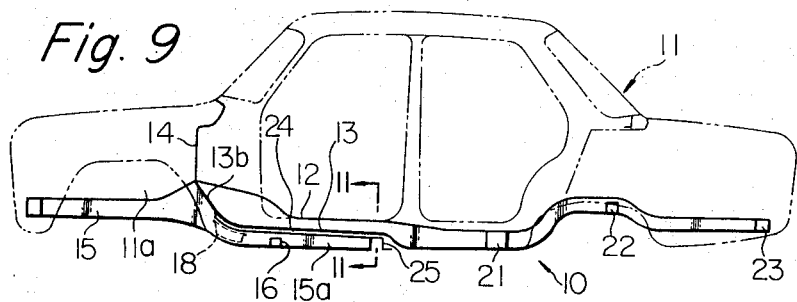
FIG. 9 is a side view of another preferred embodiment of the underbody structure according to this invention.
Figure 10:
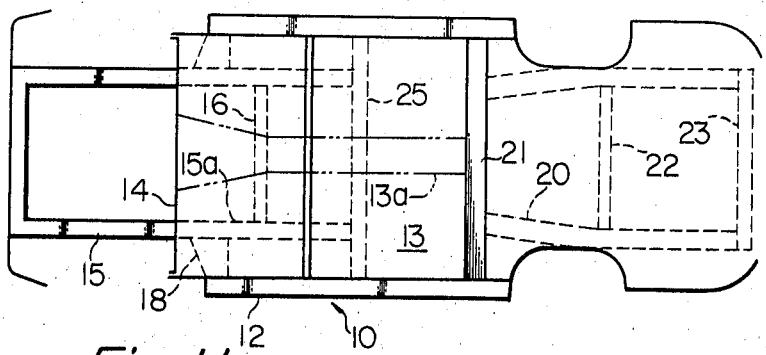
FIG. 10 is a plan view of the underbody structure shown in FIG. 9.
Figure 11:
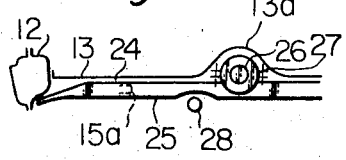
FIG. 11 is a sectional view taken on line 11—11 of FIG. 9.

Referring now to the drawings and more particularly to FIG. 4, there is shown in section a part of the conventional underbody structure which has heretofore been employed. In this conventional structure, a rear portion, designated at A, of the engine is mounted on a mount member B by means of a suspending mount rubber C. The mount member B is rigidly connected to and supporting by a side rail D. A separator E is disposed between the mount member B and the side rail D for absorbing the vibrations transferred from the engine. The side rail D is secured to a torque box F which is attached to the under surface of a floor panel G and is rigidly connected to the side wall of a side sill H. With this construction, the vibrations transferred to the mount member B invites torsional oscillations or bending vibrations of the side rail D, which in turn cause vibrations of the floor panel G thus producing undesirable noises in the passenger compartment. Furthermore, the torsional oscillations or bending vibrations of the side rail D are carried over the torque box F, through which the vibrations are also transferred to the floor panel G.

The present invention contemplates to eliminate these vibrations and noises in a satisfying fashion without adding any particular changes or modifications to the driving system of the motor vehicle while maintaining required strength and torsional rigidity.

Figure 1:
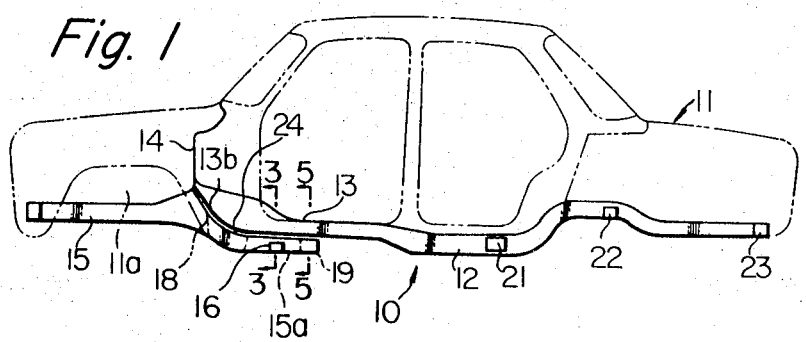
FIG. 1 is a side view of a preferred embodiment of the underbody structure according to this invention and shows a separate body in phantom lines supported thereon.
Figure 2:
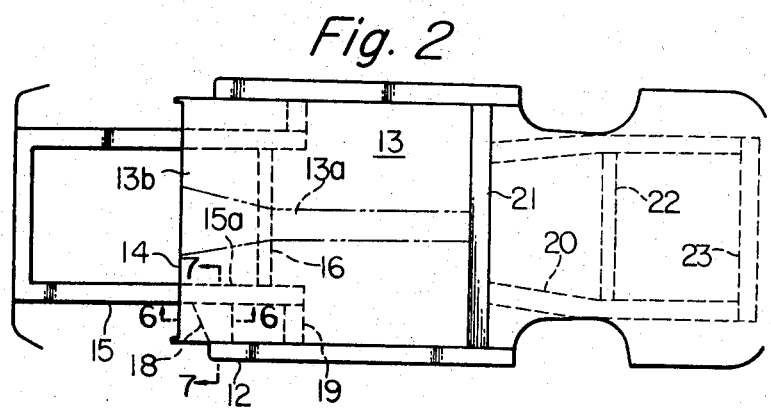
FIG. 2 is a plan view of the underbody structure shown in FIG. 1.

A preferred example of the underbody structure implementing this invention is illustrated to FIGS. 1, 2, 3, 5, 6 and 7. As shown in FIGS. 1 and 2, the underbody structure, generally designated at 10, embodying this invention is adapted to receive an support a separate body 11, which is generally shown in phantom lines in FIG. 1. The underbody structure 10 includes a pair of longitudinally extending box section side sills 12 which are transversely spaced from each other. A floor panel 13 is disposed on the side sills 12 and is welded thereto at its lateral edges. The floor panel 13 is a large sheet metal panel having a drive shaft ridge or corrugation 13a extending the full length of the panel and forming its central longitudinal structural reinforcing member. The floor panel 13 is formed with a toe board 13b, to which a dash panel 14 is welded. As seen from FIG. 1, the toe board 13b bends upwardly at an appropriate angle to form a part of the passenger compartment.

The underbody structure 10 also includes two longitudinally extending front side rails 15 which are equidistantly spaced on each side of the longitudinal center of the underbody structure and inwardly of the side sills 12. EAch of the front side rails 15 is welded to the inner wall of a front wheel housing 11a. The front side rails 15, respectively, have longitudinally extending channel shaped extensions 15a having flanges disposed outwardly to receive some of the component parts of the underbody structure, which will be discussed in detail hereinafter. As shown in FIG. 1, the front end portion of the extension 15a bends downwardly at an angle corresponding generally to the angle of the toe board 13b and terminates at the forward portion of the floor panel 13. It should be noted that although the extension 15a is shown as terminating at the forward portion of the floor panel 13, the extension 15a may terminates at, and extend to any suitable position so as to meet desired requirements as will be discussed hereinafter.

Figure 3:
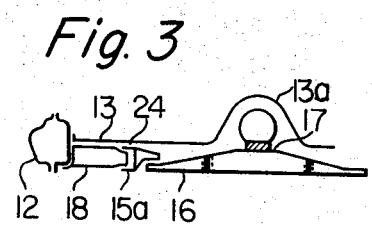
FIG. 3 is a sectional view taken on line 3—3 of FIG. 1.

A channel shaped engine rear mount member 16 extends transversely between the extensions 15a and is connected thereto at its end portions. As seen in FIG. 3, the engine rear mount member 16 has attached thereon a mounting suspension rubber 17 which supports the rear portion of the engine (not shown). The channel shaped engine rear mount member 16 has flanges (not identified) which are directed downwardly to rigidify the component parts. It will be noted that the engine front mount member for supporting the front portion of the engine is herein omitted for the sake of simplicity of illustration.

To strengthen and to rigidify the front frame portion of the underbody 10, two box section torque boxes 18 are provided which respectively extend transversely inwardly from the respective front end portions of the side sills 12 to the respective front end portions of both extensions 15a and are welded thereto in a known manner. The structural details of the torque box 18 will be fully described hereinafter.

To provide further torsional rigidity, a connecting means 19 is provided for connecting rear end portions of the extensions 15a to the adjacent portions of the side sills 12. In this illustrated embodiment, the connecting means 19 is shown as consisting of two bridges. Each of the connecting bridges 19 consists of a U-shaped member, the bottom wall of which is received in between the flanges of the extension 15a and is secued thereto. The flange portions of the U-shaped member 19 are welded to the inward wall of the respective side sill 12.

It will be appreciated that although the structural features of the rear portions of the underbody structure are nto involved in the present invention, these features will be discussed to present a complete description of the underbody. As seen from FIGS. 1 and 2, the box section side sills 12 are also coupled to a pair of rear side rails 20 through a box section torque box 21. A channel shaped cross member 22 ties the rear side rails 20 and has the flanges directed downwardly. A box section cross member 23 is attached to the rear end portions of the rear side rails 20 to provide torsional rigidity.

Reference is again made to FIGS. 1, 3, 5, 6 and 7 which illustrate an important feature of the present invention. According to this feature, the extensions 15a, the engine rear mount member 16, the torque boxes 18 ane the connecting bridges 19 are arranged to be separated from the floor panel 13 by a substantial gap 24. More particularly, the extensions 15a longitudinally extend under the floor panel 13 and are separated from the floor panel 13 having no direct contact with it. The engine rear mount member 16 is rigidly connected to the extensions 15a by suitable fastener means such as bolts and nuts and is supported thereby. As previously noted, the front portions of the extensions 15a are rigidly connected to the front portions of the side sills 12 by means of the box section torque boxes 18 (FIG. 6), each of which is fabricated of an arcuated sheet metal 18a and a channel shaped sheet metal 18b. The channel shaped sheet metal 18b has flanges (not identified), the edges of which are welded to the lateral edges of the arcuated sheet metal 18a thereby to form a box. The box section torque boxes 18 are respectively disposed between the side sills 12 and the extensions 15a in such a manner that the arcuated sheet metals 18a of the torque boxes 18 face the curved portion of the toe board 13b of the floor panel 13 to form a gap therebetween. Moreover, the connecting bridges 19 are respectively disposed between the rear end portions of the extensions 15a and the adjacent portions of the side sills 12 and are at a certain vertical distance from the floor panel 13.

With this construction, the vibrations transferred to the engine rear mount member 16 from the engine are transmitted to the extensions 15a of the front side rails 15. The vibrations transferred to the forward portions of the extensions 15a are transmitted to the front side rails 15, through which the vibrations are diverted and spread over the front wheel housing 11a of the separate body 11. Furthermore, the vibrations transferred to the forward portions of the extensions 15a are transmitted through the box section torque boxes 18 to the side sills 12, to which the vibrations transferred to the rearward portion of the extensions 15a are transmitted through the connecting bridges 19. Thus, the vibrations transferred to the engine rear mount member 16 are widely spread over a greater portion of the underbody structure and the separate body structure and, therefore, are significantly absorbed thereby. Since, in this condition, the component parts to absorb the vibrations transmitted from the engine rear mount member 16 are appropriately spaced from the floor panel 13 of the passenger compartment, the vibrations in the floor panel 13 are successively avoided and therefore a much higher riding quality can be obtained than heretofore.

In addition, the extensions of the front side rails 15 are arranged to be rigidly connected to and supported by the box section side sills 12, so that a high degree of stiffness and strength can also be obtained. Because of this structural feature, the tendency to develop vertical shaking in the front side rails is avoided in a satisfactory fashion. That is, as the front wheels of the vehicle move across uneven surfaces, the upward suspension reaction forces cause the forward portions of the front side rails 15 to move upwardly. Since, in this condition, the front side rails 15 are rigidly connected to the side sills 12 at their extensions 15a, the front side rails 15 are caused to twist or rotate about an axis extending transversely of the longitudinal axis of the underbody structure. The reaction forces resisting this twisting or rotation of the extension 15a are absorbed through the box section side sills 12 and prevented from transmitting through the floor panel 13 into the vehicle body.

Moreover, road shocks transmitted through the suspension system can be absorbed through the extensions 15a, box section torque boxes 18, the connecting bridges 19 and the side sills 12 associated therewith before such shocks are transmitted through the floor panel 13 to the passenger compartment. Thus, undesirable noises that would otherwise be generated in the passenger compartment can be eliminated thereby improving the riding qualities.

The shearing stresses or bending stresses due to the reaction forces of the suspension system are spread through the torque boxes 18 and the connecting bridges 19 over to the side sills 12 and thus a rigid construction is obtained.

FIG. 8 illustrates a modified form of the first embodiment of the underbody structure according to this invention, wherein connecting bridges 24 are respectively integral with the extensions 15a of the front side rails 15. The rear end portions of these connecting bridges 24 are welded to the box section side sills 12 in a manner already discussed.

Another preferred embodiment of the underbody structure according to this invention is illustrated in FIGS. 9, 10, 11 and 13, wherein like component parts are designated by same numerals. The second embodiment of the underbody structure of this invention is specifically suited for eliminating drawbacks encountered in a conventional underbody construction, which will be described in detail hereinafter. As the vehicle is running at a high speed, that is, at a speed of 120-150 Km/h, the vehicle body and accordingly the passenger compartment are caused to vibrate thereby to generate noises because of resonance vibrations in the driving system. Thus, it is required that the natural vibrations in the driving system be increased to reduce exciting forces from the driving system during high speed running of the vehicle. To this end, it is common practice to divide the propeller shaft into two sections which are connected with each other through a universal joint. This needs a center bearing mount member to be provided on the central portion of the floor panel.

Figure 12:
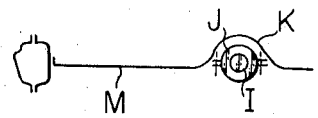
FIG. 12 is a view illustrating a part of a conventional underbody structure, the part corresponding to that of FIG. 11.

FIG. 12 is presented to show how the center bearing mount member is conventionally supported by the floor panel. In FIG. 12, the center bearing mount member, designated at I, is supported by an enforcing member J which is rigidly connected to a driving shaft corrugation K of a floor panel M. With this construction, the vibrations or noises in the passenger compartment can be decreased to some extent because the natural vibrations in the driving system is increased. Since, however, the enforcing member J is directly connected to the floor panel corrugation K, it is quite difficult to completely prevent the vibrations from being transmitted to the floor panel M.

Turning now to FIGS. 9, 10, 11 and 13, the connecting bridge, designated at 25, is shown as consisting of one unitary channel shaped member. The connecting bridge 25 extends between the box section side sills 12 and is rigidly connected thereto. The connecting bridge 25 is spaced from the floor panel 13 by a suitable distance 24 in a manner previously discussed. In this illustrated embodiment, a center bearing mount member 26 is mounted within a reinforcing member 27 which is directly connected to the connecting means 25 by means of suitable fasteners. The connecting bridge 25 has flanges directed downwardly, one of which is welded to the rearward edges of the extensions 15a to provide torsional rigidity. In this construction, the vibrations transmitted from the center bearing mount member 26 are transferred to the reinforcing member 27, through which the vibrations are transmitted to the connecting bridges 25 and the side sills 12 connected thereto. Thus, the vibrations are prevented from direct transmission to the floor panel 13 and, therefore, the vibration noises are avoided in the passenger compartment.

Designated by reference numeral 28 is an engine exhaust pipe, which is supported by the connecting bridges 25. This construction is advantageous in that vibrations transmitted from engine exhaust system can be prevented from being transmitted to the floor panel 13.

Figure 13:
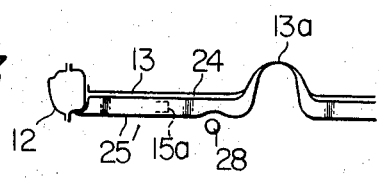
FIG. 13 is a sectional view illustrating a modified form of the underbody structure shown in FIG. 11.

FIG. 13 illustrates a modified form of the second embodiment of the underbody structure of this invention, wherein the center bearing mount member and the enforcing member are omitted. In this modification, the connecting bridge 25' is shown as being two separated members. Each member has one end portion connected to the side sills 12 and has the other end portion of each member welded to the floor panel 13.

Figure 14:
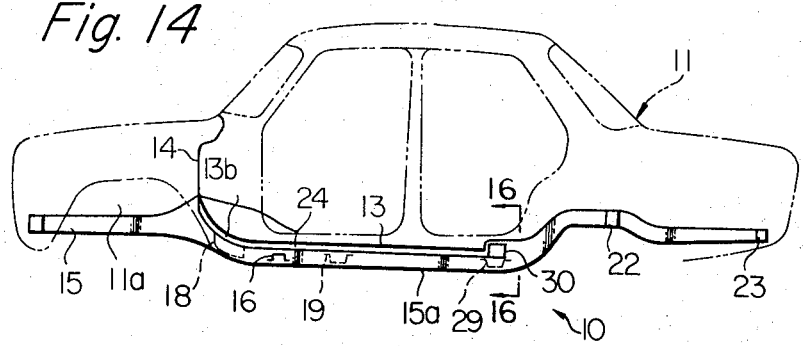
FIG. 14 is a side view of a still another preferred embodiment of the underbody structure according to this invention.
Figure 15:
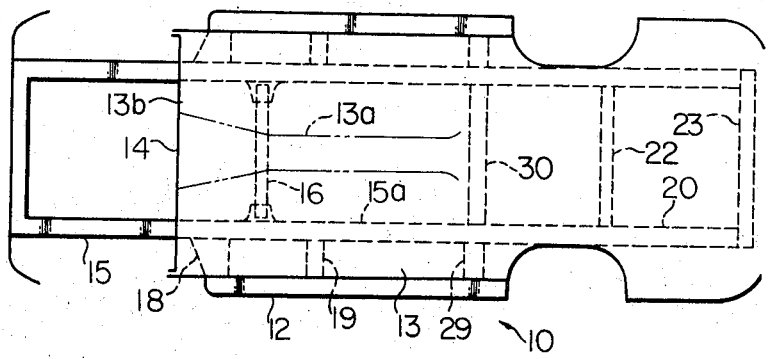
FIG. 15 is a plan view of the underbody structure shown in FIG. 14.
Figure 16:
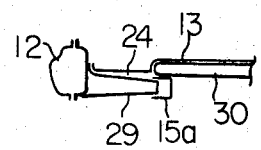
FIG. 16 is a sectional view taken on line 16—16 of FIG. 14.

A third preferred embodiment of the underbody structure according to this invention is illustrated in FIGS. 14 to 16, wherein like component parts are designated by same numerals as those used in other drawings. In this illustrated embodiment, the extensions 15a are connected to the rear rails 20 to provide an integral construction and are separated from the floor panel 13 as previously discussed. As shown, the underbody structure of this embodiment further includes, in addition to the component parts as already described, U-shaped connecting bridges 29 and a box section cross member 30. As best seen in FIG. 16, the box section cross member 30 is welded to the extensions 15a and is supported thereby. The U-shaped connecting bridges 29 extends between the extensions 15a and the side sill 12 and is arranged to be separated from the floor panel 13 in the manner previously discussed. The U-shaped connecting bridges 29 thus arranged has a bottom wall portion which is received in the extension 15a and has flanges welded to the box section side sill 12. It will be appreciated that the underbody structure thus constituted possesses a high strength and torsional rigidity. It should be noted that a detailed description of other structural features are omitted herein for the sake of simplicity of illustration because such features are the same with those of the first and second embodiments.

What is claimed is:

1. An underbody structure for a motor vehicle driven by an engine comprising, in combination, a pair of transversely spaced, longitudinally extending side sills; a floor panel connected at its lateral edges to said side sills; a pair of transversely spaced, longitudinally extending front side rails; a pair of transversely spaced, longitudinally extending rear side rails, the side rails being spaced inwardly of said side sills, an extension longitudinally rearwardly extending from each of said front side rails, said extension consisting of a channel section member with outwardly directed flanges; an engine rear mount member transversely extending between and rigidly connected to said extensions; a pair of torque boxes each extending transversely inwardly from one end portion of each side sill to a front end portion of each extension and rigidly connected thereto; and connecting means rigidly connecting said extensions to said side sills, the end portions of said torque boxes being received by said outwardly directed flanges of said extensions; said extensions, said engine rear mount member, said torque boxes and said connecting means being isolated from said floor panel with a vertical space.

2. An underbody according to claim 1, wherein said connecting means comprises a pair of spaced connecting bridges extending respectively between rear end portions of said extensions and said side sills, said connecting bridges each consisting of a U-shaped member.

3. An underbody structure according to claim 2, wherein said engine rear mount member is connected between said rear end portions of the extensions.

4. An underbody structure according to claim 3, wherein said connecting bridges extend divergently between the rear end portions of said extensions and said side sills.

5. An underbody structure according to claim 1, wherein said engine rear mount member consists of a channel section construction with downwardly directed flanges.

6. An underbody structure according to claim 1, wherein said connecting means comprises a unitary connecting bridge which transversely extends between and is rigidly connected to said side sills.

7. An underbody structure according to claim 1, wherein said extensions of the front side rails extend respectively to said rear side rails and are integrally connected therewith.

8. An underbody structure according to claim 6, wherein said connecting bridge consists of a channel section member with downwardly directed flanges, one of which is secured to the rearward edge of said extensions.

9. An underbody structure according to claim 6, wherein said channel section member includes means for mounting a center bearing to support a propeller shaft of said motor vehicle.

10. An underbody structure according to claim 9, further comprising a cross member transversely extending between and supported by said extensions.

* * * * *